(12) United States Patent
Plattner et al.

(10) Patent No.: US 8,572,063 B2
(45) Date of Patent: Oct. 29, 2013

(54) COMPUTER-IMPLEMENTED METHOD FOR OPERATING A DATABASE AND CORRESPONDING COMPUTER-SYSTEM

(75) Inventors: Hasso Plattner, Schriesheim (DE); Jens Krueger, Oranienburg (DE); Martin Grund, Berlin (DE); Alexander Zeier, Berlin (DE)

(73) Assignee: Hasso-Plattner-Institut fur Softwaresytemtechnik GmbH, Potsdam (DE)

( * ) Notice: Subject to any disclaimer, the term of this patent is extended or adjusted under 35 U.S.C. 154(b) by 133 days.

(21) Appl. No.: 12/827,874

(22) Filed: Jun. 30, 2010

(65) Prior Publication Data

US 2011/0161387 A1 Jun. 30, 2011

Related U.S. Application Data

(60) Provisional application No. 61/221,624, filed on Jun. 30, 2009.

(51) Int. Cl.
*G06F 17/30* (2006.01)

(52) U.S. Cl.
USPC ........... 707/706; 707/713; 707/722; 707/736; 707/758; 707/781

(58) Field of Classification Search
USPC ................................................ 707/600–899
See application file for complete search history.

(56) References Cited

U.S. PATENT DOCUMENTS 6,487,457 B1 * 11/2002 Hull et al. ...................... 700/17
2009/0299969 A1   12/2009 Le

FOREIGN PATENT DOCUMENTS

EP        2040180 A1   3/2009
WO     2009037363 A1   3/2009

OTHER PUBLICATIONS

EP Search Report (from a corresponding foreign application), EP 10167993.4, dated Aug. 23, 2010.
Hasso Plattner, "A Common Database Approach for OLTP and OLAP Using an In-Memory Column Database," 35th Sigmod International Conference on Management of Data, Jun. 29, 2009.
Fay Chang et al., "BigTable: A Distributed Storage System for Structured Data," 7th Symposium on Operating Systems Design and Implementation. Nov. 6-8, 2006, pp. 205-218.
Daniel J. Abadi, et al., "SW-Store: A Vertically Partitioned DBMS for Semantic Web Data Management," the VLDB Journal; The International Journal on Very Large Data Bases,k Springer, Berlin, Feb. 4, 2009, pp. 385-406.
Daniel J. Abadi et al., "Integrating Compression and Execution in Column-Oriented Database Systems," ACM Proceedings of Sigmod. International Conference on Management of Data, Jun. 27, 2006, pp. 671-682.
Mike Stonebraker et al., "C-Store: A Column-oriented DBMS," Proceedings of the 31st VLDB Conference, Norway, 2005.

\* cited by examiner

*Primary Examiner* — Isaac M Woo
(74) *Attorney, Agent, or Firm* — Fountainhead Law Group, PC

(57) ABSTRACT

The invention relates to a computer-implemented method for operating a database comprising the step of updating a binary status of a tuple in the database. The binary status field either contains a null value or a time stamp. The update can be done in-place or by using an insert-only approach.

8 Claims, 8 Drawing Sheets

Before Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | | 2009-10-21 | |

After Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | | 2009-10-21 | 2009-10-22 |
| 95769217 | 2009-10-21 | 454 | 21,20 | 2009-10-22 | 2009-10-22 | |

Before Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | | 2009-10-21 | |

After Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | 2009-10-22 | 2009-10-21 | |

FIG. 8

Before Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | | 2009-10-21 | |

After Update:

| VBELN | AEDAT | KUNNR | NETWR | STATUS | BEGIN | END |
|---|---|---|---|---|---|---|
| 95769214 | 2009-10-01 | 584 | 10,24 | 2009-10-01 | 2009-10-01 | |
| 95769215 | 2009-10-01 | 1215 | 124,35 | 2009-10-01 | 2009-10-01 | |
| 95769216 | 2009-10-21 | 584 | 47,11 | | 2009-10-21 | |
| 95769217 | 2009-10-21 | 454 | 21,20 | | 2009-10-21 | 2009-10-22 |
| 95769217 | 2009-10-21 | 454 | 21,20 | 2009-10-22 | 2009-10-22 | |

FIG. 9

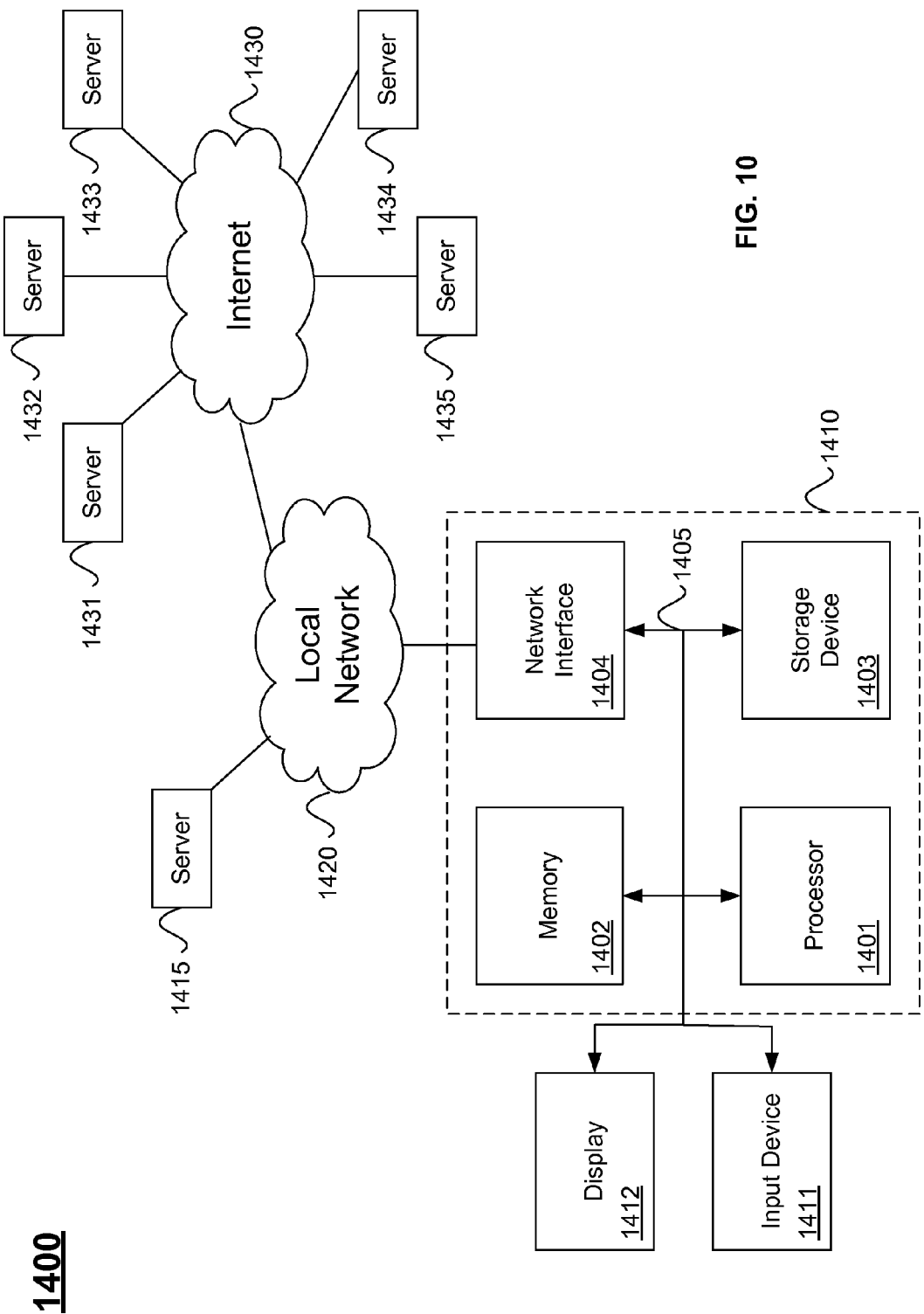

COMPUTER-IMPLEMENTED METHOD FOR OPERATING A DATABASE AND CORRESPONDING COMPUTER-SYSTEM

CROSS REFERENCE TO RELATED APPLICATIONS

This application claims the benefit of U.S. Provisional Application No. 61/221,624, filed Jun. 30, 2009, entitled "Common Database Approach for OLTP and OLAP Using an In-Memory Column Database", which is incorporated herein by reference.

BACKGROUND

The invention relates to a computer-implemented method for operating a database, in particular for updating a binary status of a tuple in the database.

Unless otherwise indicated herein, the approaches described in this section are not prior art to the claims in this application and are not admitted to be prior art by inclusion in this section.

Relational database systems have been the backbone of business applications for more than 20 years. They promised to provide companies with a management information system covering the core applications, including financials, sales, order fulfillment, manufacturing, and human resources, which run from planning, through business processes, to individually defined analytics. However, this goal has not been achieved. The more complex business requirements became, the more the focus was put on the so-called transactional processing part and designed the database structures accordingly. These systems are called OLTP systems (Online Transactional Processing). Analytical and financial planning applications were increasingly moved out to separate systems for more flexibility and better performance. These systems are called OLAP systems (Online Analytical Processing). In reality, parts of the planning process were even moved off to specialized applications mainly around spreadsheets.

Both systems, OLTP and OLAP, are based on the relational theory but with different technical approaches [W. H. Inmon. Building the Data Warehouse, 3rd Edition. John Wiley & Sons, Inc., New York, N.Y., USA, 2002]. For OLTP systems, tuples are arranged in rows which are stored in blocks. The blocks reside on disk and are cached in main memory in the database server. Sophisticated indexing allows fast access to single tuples, however accesses get increasingly slower as the number of requested tuples increases. For OLAP systems on the other hand, data are often organized in star schemas, where a popular optimization is to compress attributes (columns) with the help of dictionaries. After the conversion of attributes into integers, processing becomes faster. More recently, the use of column store databases for analytics has become quite popular. Dictionary compression on the database level and reading only the columns necessary to process a query speed up query processing significantly in the column store case.

The introduction of so-called data warehouses must be considered to be a compromise. The flexibility and speed gained had to be paid for with additional management of the extraction and loading of data, and controlling of the redundancy. For many years, the discussion seemed to be closed and enterprise data was split into OLTP and OLAP [C. D. French. "One Size Fits All" Database Architectures Do Not Work for DDS. In Proceedings of the 1995 ACM SIGMOD International Conference on Management of Data, San Jose, Calif., May 22-25, 1995 [1], pages 449-450]. The OLTP is the necessary prerequisite for the OLAP. However only with the OLAP can companies understand their business and come to conclusions about how to steer and change course. When planned data and actual data are matched, business becomes transparent and decisions can be made. While centralized warehouses also handle the integration of data from many sources, it is still desirable to have OLTP and OLAP capabilities in one system which could make both components more valuable to their users.

The last 20 years, Moore's law enabled the enterprise system to grow both in functionality and volume [G. E. Moore. Cramming More Components Onto Integrated Circuits. Electronics, 38(8), 1965]. When the processor speed hit the 3 GHz level (2003) and further progress seemed to be distant, two developments helped out: unprecedented growth of main memory and massive parallelism through blade computing and multi-core CPUs [G. Koch. Discovering Multi-Core: Extending the Benefits of Moore's Law. Technology@Intel, (7), 2005]. While main memory was always welcome for e.g. caching and a large number of CPUs could be used for application servers, the databases for OLTP where not ideally suited for massive parallelism but stayed on SMP (symmetric multi processing) servers. The reasons were temporary locking of data storage segments for updates and the potential of deadlocks while updating multiple tables in parallel transactions. This is the main reason why for example R/3 from SAP ran all update transactions in a single thread and relied heavily on row level locking and super fast communication between parallel database processes (SMP). Some of the shortcomings could be overcome later by a better application design, but the separation of OLTP and OLAP remained unchallenged.

Early tests with in-memory databases of the relational type based on row storage did not show significant advantages over leading RDBMSs with equivalent memory for caching. Here the alternative idea to use column store databases for OLTP was born. Column storage was successfully used for many years in OLAP and really surged when main memory became abundant [M. Stonebraker, D. J. Abadi, A. Batkin, X. Chen, M. Cherniack, M. Ferreira, E. Lau, A. Lin, S. Madden, E. J. O'Neil, P. E. O'Neil, A. Rasin, N. Tran, and S. B. Zdonik. C-Store: A Column-oriented DBMS. In Proceedings of the 31st International Conference on Very Large Data Bases, Trondheim, Norway, Aug. 30-Sep. 2, 2005, pages 553-564. ACM, 2005] [P. Boncz. Monet: A Next-Generation DBMS Kernel for Query-Intensive Applications. 2002. PhD Thesis, Universiteit van Amsterdam, Amsterdam, The Netherlands].

Column Storage is Best Suited for Modern CPUs

Modern CPUs with multi-core architecture provide an enormous amount of computing power. Blades with 8 CPUs and 16 cores per CPU will populate next-generation blade servers. That gives us 128 computing units with up to approximately 500 GB of main memory. To optimize the use of these computing devices we have to understand memory hierarchies, cache sizes and how to enable parallel processing within one program [P. A. Boncz, S. Manegold, and M. L. Kersten. Database Architecture Optimized for the New Bottleneck: Memory Access. In VLDB'99, Proceedings of 25th International Conference on Very Large Data Bases, Sep. 7-10, 1999, Edinburgh, Scotland, UK, pages 54-65. Morgan Kaufmann, 1999]. Considering the memory situation first, enterprise applications are to a large extent memory bound, that means the program execution time is proportional to the amount of memory accessed for read/write or being moved.

As an example, a full table scan of SAP's accounting document line items table is considered, which has 160 attributes, in order to calculate a total value over all tuples.

The inventors used the accounting data of a German brewery of 5 years, the number of tuples in this table was 34 million. In the underlying row database, 1 million tuples of this particular table consume about 1 GB of space. The size of the table was thus 35 GB. The equivalent column store table size was only 8 GB because of the more efficient vertical compression along columns. Considering that in real world applications only 10% of the attributes of a single table are typically used in one SQL-statement (see FIG. 1), that means for the column store at most 800 MB of data have to be accessed to calculate the total values [S. Aulbach, T. Grust, D. Jacobs, A. Kemper, and J. Rittinger. Multi-Tenant Databases for Software as s Service: Schema-Mapping Techniques. In Proceedings of the ACM SIGMOD International Conference on Management of Data, SIGMOD 2008, Vancouver, BC, Canada, Jun. 10-12, 2008, pages 1195-1206. ACM, 2008]. FIG. 2 shows (schematically) that the row storage with horizontal compression cannot compete, if processing is set-oriented and requires column operations. Even with the appropriate index the amount of data accessed is orders of magnitude higher.

According to the inventors' analyses of real systems with customer data, most applications in enterprise computing are actually based on set processing and not single tuple access. Thus, the benefit of having data arranged in a column store is substantial. In addition to this, most of the calculations can be executed on row level using the compressed, integer format. A performance gain of a factor 100-1000 in comparison to the same calculation executed on non-compressed data formats at the application level can be achieved. The application layer has to work with minimal projections in local SQL statements and avoid using more generic SQL statements in subroutines to support the reduction in memory access.

On top of these benefits comes the introduction of parallel processing. According to Hennessy in [J. L. Hennessy and D. A. Patterson. Computer Architecture—A Quantitative Approach. Morgan Kaufmann, fourth edition, 2007], the difficulty of creating parallel processing programs is to break up a program into equal-sized pieces, which then can be processed in parallel without much synchronization. The select operation through one or more columns is exactly what we are looking for. This operation can indeed be split easily into equal parts and distributed to multiple cores. The standard operations of OLAP engines and any other formal application logic e.g. calculation of due dates, currency conversion, working days for a given date interval etc. can be handled by stored procedures operating on the integer values of the compressed columns.

All calculations on the tuple level will automatically be parallelized, since they are completely independent of each other. The first level of an aggregation will be executed synchronously for each qualified tuple. The synchronization between the core processes is minimal. Further aggregation along given hierarchies take place as a second step on the accumulated data. The same applies to sorting by attributes or sequencing by time.

Even if only a few tuples qualify through the selected statement, the introduction of indices is not necessary because the scanning speed is so enormous, especially if parallel processing on multiple cores is active. On current CPUs, we can expect to process 1 MB per ms and with parallel processing on 16 cores>10 MB per ms. To put this into context, to look for a single dimension compressed in 4 bytes, we can scan 2.5 million tuples for qualification in 1 ms. With this speed in mind, it is not even necessary to provide a primary key index for most of the tables but the full column scan can be used instead. Column storage is so well suited for modern CPUs that the full scope of the relational algebra can be used without shortcomings in performance. It is important to note that every attribute now represents a potential index. There are no restrictions any more for the applications to focus on certain navigation paths. The delegation of most of the calculations to the database layer cleans up the application layer and leads to a better separation of concerns. This will result in a higher quality of programs and allow a better lifecycle with ongoing development. The hard disk is used only for transaction logging and snapshots for fast recovery. In fact, disk has become yesterday's tape [J. Gray. Tape is Dead. Disk is Tape. Flash is Disk, RAM Locality is King. Storage Guru Gong Show, Redmon, Wash., 2006].

SUMMARY

It is an object of the present invention to further improve operation and performance of databases.

This object is solved by the present invention by providing a method according to claims 1 and 4 and a corresponding computer system according to claims 7 and 8.

In a method according to the present invention, a binary status of a tuple in a database is updated. The update can be done in-place, i.e., the value of a binary status field in an existing tuple is changed, while the other fields of the tuple remain unchanged. Alternatively, an insert-only approach can be used for updating, i.e., an updated tuple where the value of the binary status field has been changed is inserted into the database.

The value of the binary status field of the tuple is a null value if the binary status of the tuple is a first status and is a time stamp if the binary status of the tuple is a second status. For example, the status of an invoice can change from "unpaid" (binary status field value: NULL) to paid (binary status field value: time stamp).

The time stamp can comprise a date and/or a time. Date and/or time of the time stamp can be the date and/or time when the status change occurred or when the status update is applied.

In a preferred embodiment of the invention the database is a column store database.

In a further preferred embodiment of the invention the column containing the binary status fields is stored uncompressed.

The present invention also relates to a computer system that implements a computer program for operating a column store database. Said computer program comprises an updating component for updating a binary status of a tuple in the database by means of in-place updating the binary status field of the tuple with a time stamp.

Alternatively, a computer system implements a computer program for operating a column store database, wherein said computer program comprising an updating component for updating a binary status of a tuple in the database by means of inserting an updated tuple into the database, wherein the binary status field of the updated tuple contains a time stamp.

The following detailed description and accompanying drawings provide a better understanding of the nature and advantages of the present invention.

BRIEF DESCRIPTION OF THE DRAWINGS

FIG. 8 illustrates the method according to a first embodiment of the present invention;

FIG. 9 illustrates the method according to a second embodiment of the present invention; and FIG. 10 is a block diagram of an example computer system and network for implementing embodiments of the present invention.

DETAILED DESCRIPTION

Described herein are techniques for improving the operation and performance of databases. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Column Storage is Suited for Update-Intensive Applications

Figures 1, 2:
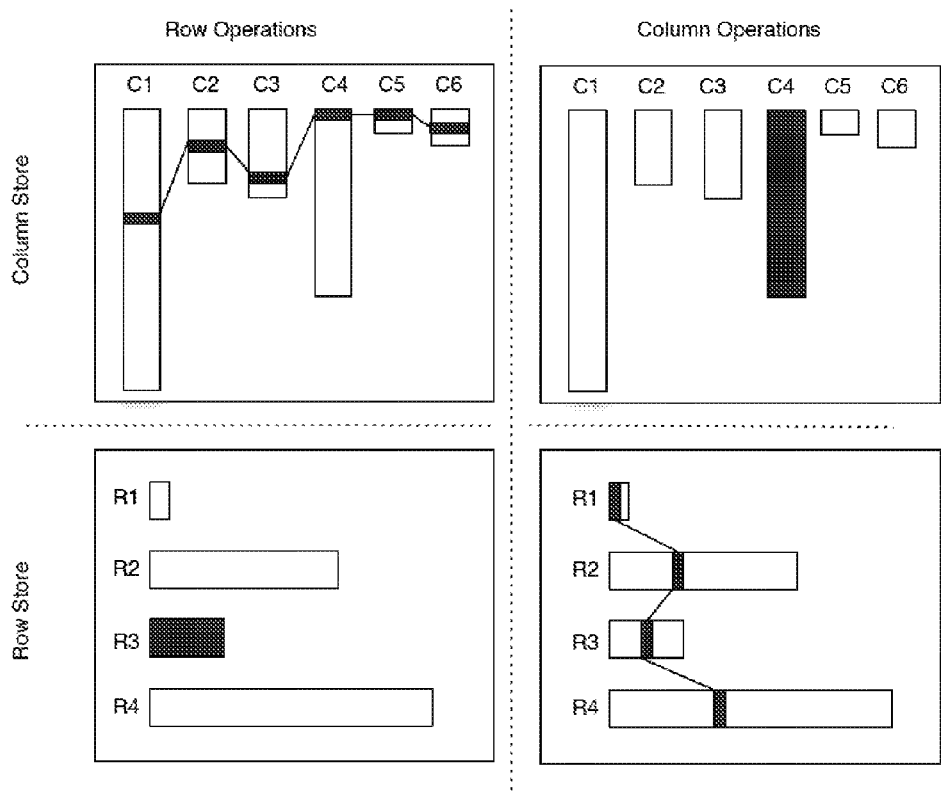
FIG. 1 illustrates an example query and schema.
FIG. 2 illustrates data access in row and column storage.
Figure 3:
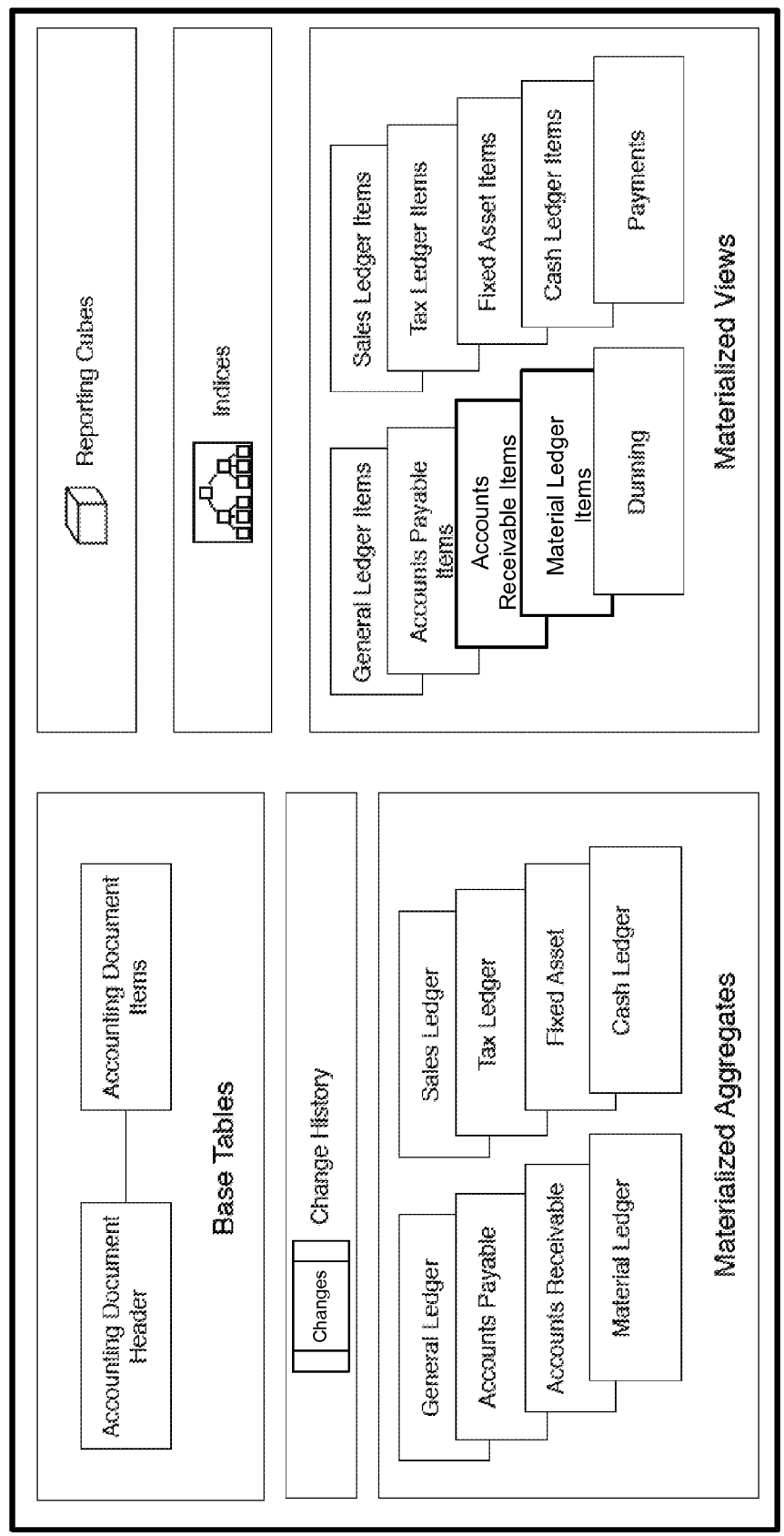
FIG. 3 illustrates a schema of a financial system.

Column store databases are said to be expensive to update [G. P. Copeland and S. Khoshafian. A Decomposition Storage Model. In Proceedings of the 1985 ACM SIGMOD International Conference on Management of Data, Austin, Tex., May 28-31, 1985, pages 268-279. ACM Press, 1985]. Having all data in main memory greatly improves the update performance of column stores, but we still the potential expansion of the attribute dictionaries must be considered, which could lead to a situation where the compression has to be recalculated and thus affects the whole column. Therefore, the inventors analyzed the updates in a financial system (FIG. 3) in more detail.

History of SAP's Database Table Design

The large number of materialized views and materialized aggregates might be astonishing at first glance. This redundancy became necessary to achieve reasonable response times for displaying the line items. The higher number of inserts and the problematic update of redundant data using database triggers or procedural code was the price to pay. The customer-defined roll-ups into cubes in the OLAP part of the system allowed a flexible reporting at a reasonable response speed but added complexity and extra system management overhead.

Customer Data Analysis

In analyzing the change logs of 4 different SAP customers the inventors found that updates can be categorized into three major types:

Aggregate update: The attributes are accumulated values as part of materialized views (between 1 and 5 for each accounting line item)

Status update: Binary change of a status variable, typically with time stamps

Value update: The value of an attribute changes by replacement

Aggregate Updates

Figure 4:
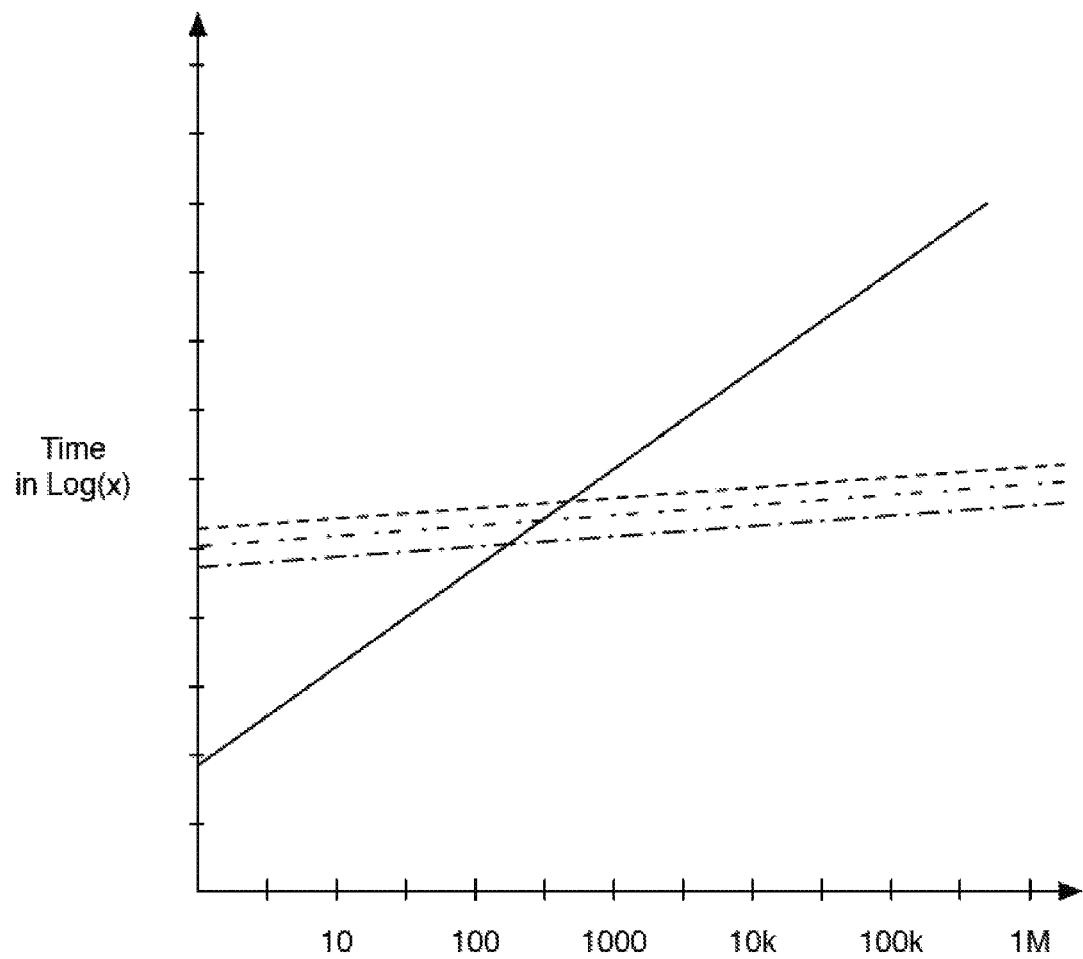
FIG. 4 illustrates a performance comparison of aggregation on the fly vs. Read of materialized views.

Most of the updates taking place in financial applications apply to total records following the structure of the coding block. The coding block can contain e.g. account number, legal organization, year, etc. These total records are basically materialized views on the journal entries in order to facilitate fast response time where aggregations are requested. Since the roll-ups into multi-dimensional cubes became obsolete when data warehouses based on column storage were introduced [J. Schaffner, A. Bog, J. Krüger, and A. Zeier. A Hybrid Row-Column OLTP Database Architecture for Operational Reporting. In Proceedings of the Second International Workshop on Business Intelligence for the Real-Time Enterprise, BIRTE 2008, in conjunction with VLDB'08, Aug. 24, 2008, Auckland, New Zealand, 2008] (see for example SAP Business Warehouse Explorer), the inventors analyzed whether aggregates could be created via algorithms and always on the fly. The more instances of aggregates are requested the better for the relative performance of the column storage (FIG. 4). The creation of aggregates corresponds to a full column scan, therefore the number of multiple aggregates in the response set has only little impact on the response time. In a record storage, the response time increases linearly with the number of aggregates read.

Status Updates

Status variables (e.g. to be paid, paid) typically use a predefined set of values and thus create no problem with an in-place update since the cardinality of the variable does not change. It is advisable that compression of sequences in the columns is not allowed. If the automatic recording of status changes is preferable for the application, the insert-only approach for these changes can also be used. In case the status variable has only two values, a null value and a time stamp are the best option. An in-place update is fully transparent even considering time-based queries.

FIG. 8 shows an example for an in-place status update of a tuple in a database. The upper table in FIG. 8 shows some exemplary tuples from a database. In the first two tuples (VBELN=95769214 and VBELN=95769215) the status field (STATUS) contains a date time stamp. The processes (e.g., business processes) associated with these two tuples are considered to be closed (e.g., an invoice has been paid). In the third and fourth tuple (VBELN=95769216 and VBELN=95769217) the status field (STATUS) contains a null value. The processes associated with these two tuples are considered to be open (e.g., an invoice has not been paid, yet).

If the process associated with the last tuple (VBELN=95769217) becomes closed (e.g., the invoice has now been paid), the status field (STATUS) of this tuple is updated by inserting a time stamp (Oct. 22, 2009). No additional tuple is inserted. The resulting table is shown as the lower table in FIG. 8.

FIG. 9 shows an example for a status update of a tuple in a database using the insert-only approach. The upper table in FIG. 9 shows some exemplary tuples from a database. In the first two tuples (VBELN=95769214 and VBELN=95769215) the status field (STATUS) contains a date time stamp. The processes (e.g., business processes) associated with these two tuples are considered to be closed (e.g., an invoice has been paid). In the third and fourth tuple (VBELN=95769216 and VBELN=95769217) the status field (STATUS) contains a null value. The processes associated with these two tuples are considered to be open (e.g., an invoice has not been paid, yet).

If the process associated with the last tuple (VBELN=95769217) becomes closed (e.g., the invoice has now been paid), the status is updated by inserting a new tuple at the end of the table. The new tuple is identical with the tuple to be updated, except for the status field (STATUS) which includes a time stamp (Oct. 22, 2009). In order to indicate that the tuple containing a null value in the status field (STATUS) is out-dated, a time stamp is inserted into the END field of that tuple. This is explained in more detail below in the section "CONSEQUENCES OF THE INSERT-ONLY APPROACH". The resulting table is shown as the lower table in FIG. 9.

Value Updates

Figure 5:
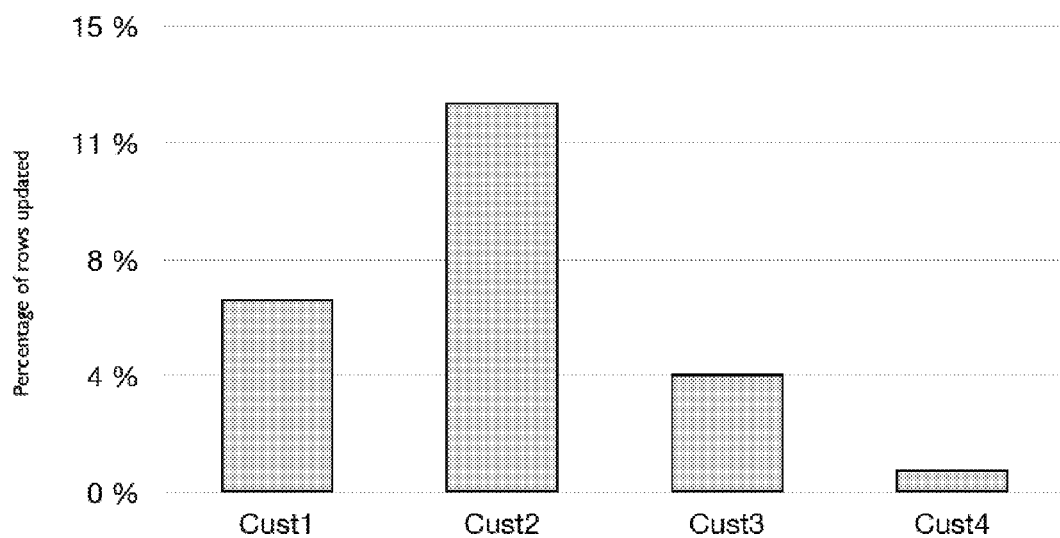
FIG. 5 illustrates update frequencies in financial accouting.

Since the change of an attribute in an enterprise application in most cases has to be recorded (log of changes), an insert-only approach seems to be the appropriate answer. FIG. 5 shows that only <5% of the tuples of a financial system will be changed over a long period of time. The extra load for the delta manager (the write-optimized store in a column store database which handles updates and inserts) and the extra consumption of main memory are acceptable. With the insert-only approach, nearly all attributes remain compressible and the change history is captured including time and origin of the change.

Despite the fact that typical enterprise systems are not really update-intensive, by using insert-only and by not maintaining totals, we can even reduce these updates. Since there are less updates, there are less locking issues and the tables can be more easily distributed (partitioned) horizontally across separate computing units (blades) with a shared nothing approach [M. Stonebraker. The Case for Shared Nothing. IEEE Database Engineering Bulletin, 9(1):4-9, 1986]. Having basically eliminated the updates only the inserts and the reads need to be considered.

Figure 6:
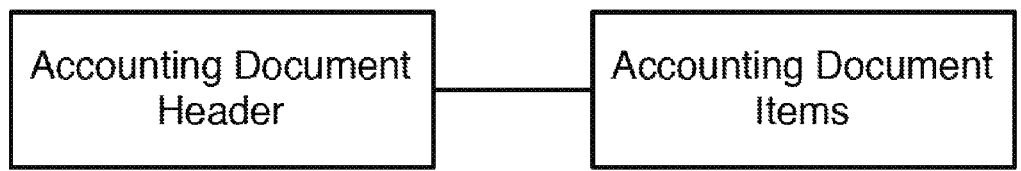
FIG. 6 illustrates a simplified financials system.

With these recommended changes to the financial system, the number of major tables will drop from more than 18 to 2 (not including change history, indices, and OLAP cubes), as depicted in FIG. 6. Only the accounting documents—header and line items—are kept in tables. The insert-only approach and calculation algorithms executed on the fly replace all indexes, materialized views and change history.

Consequences of the Insert-Only Approach

With the insert-only approach the update of tuples by the application could be eliminated with the exception of binary status variables. Having multiple versions of the same tuple in the database requires that the older ones be marked as currently not valid. Each inserted tuple carries the time stamp of its creation (in FIGS. 8 and 9 in the BEGIN field of the tuple) and in case it is being updated, the time stamp of the update (in FIGS. 8 and 9 in the END field of the tuple). Only the latest version of a tuple carries no update time stamp and is therefore easily identifiable. The benefit of this concept is any state of the tuple can be recreated by using the two time stamps with regards to a base date for the query. This approach has been adopted before in POSTGRES [M. Stonebraker, L. A. Rowe, and M. Hirohama. The Implementation of Postgres. IEEE Transactions on Knowledge and Data Engineering, 2(1):125-142, 1990] in 1987 and was called "timetravel". The extended SQL has to support a base date parameter through which the valid version of a tuple can be identified.

To carry all older versions of a tuple in the same table has significant application advantages especially in planning applications, where retrieving older versions of data is common [S. Chaudhuri and U. Dayal. An Overview of Data Warehousing and OLAP Technology. SIGMOD Record, 26(1):65-74, 1997]. In addition to that it completely eliminates the necessity of creating a separate log of the changes. The additional storage capacity requirements can be ignored.

An update of a tuple results in an insert of the new version and an update of the last valid one. The time stamp attributes are not participating in any compression algorithm and therefore do not lead to any reorganization of the column when updated. Since multiple queries can coincide with inserts and updates, extreme care has to be taken to avoid too much locking on table-, column- or dictionary level.

Inserts are added to the delta store of the appropriate position of a table. The time stamp at the start of a query defines which tuples are valid (only tuples with a lower time stamp). In case an insert is in progress (single or multiple ones) the time stamp of the start of a new query will be set to the time stamp of the insert transaction minus one, and again the ongoing insert(s) will be ignored. This procedure is equivalent to snapshot isolation via time stamps [D. Majumdar. A Quick Survey of MultiVersion Concurrency Algorithms, 2007. <simpledbm.googlecode.com/files/mvcc-survey-1.0.pdf>].

The logical update splits into an insert of the tuple with the new values and a notification of the old one that it is no longer valid. Again, the same time stamp logic applies and a costly locking mechanism can be avoided [H. Berenson, P. A. Bernstein, J. Gray, J. Melton, E. J. O'Neil, and P. E. O'Neil. A Critique of ANSI SQL Isolation Levels. In Proceedings of the 1995 ACM SIGMOD International Conference on Management of Data, San Jose, Calif., May 22-25, 1995 [1], pages 1-10]. Future research will specifically focus on concurrency and locking issues. As a general rule the data base system should perform each test with maximum speed, even occupying all resources (e.g. CPU cores) in order to reduce the potential for collisions and increasing management overhead.

Figure 7:
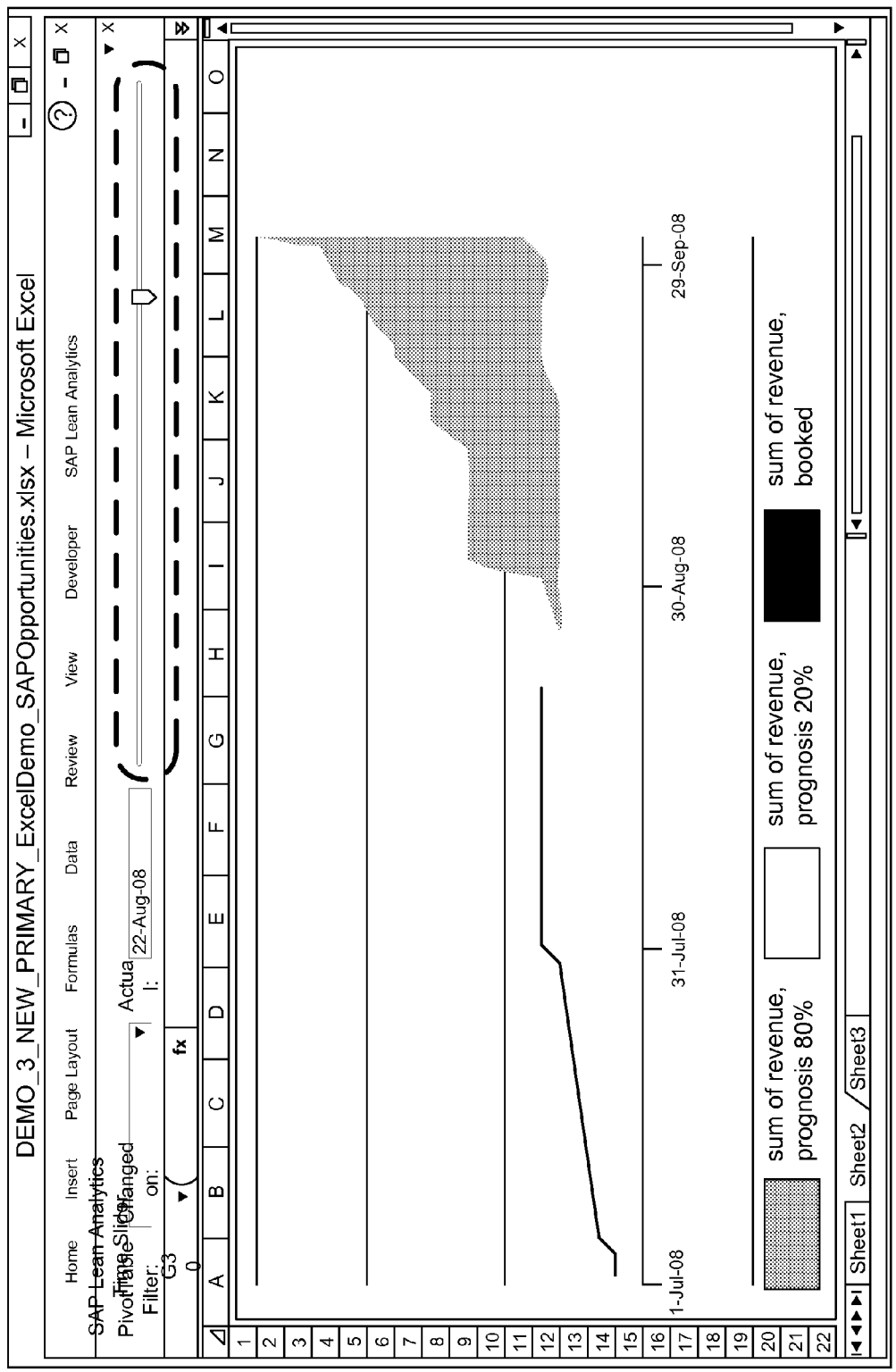
FIG. 7 illustrates a sales pipeline forecast using historical versions of the data.

Having the complete history of a tuple in the table allows the application to develop presentations of the evolution of facts over time. An example is the evolution of the sales forecast per day over a quarter in correlation with external events to better understand trends and improve the extrapolation (FIG. 7). Despite the application induces a full table scan for each incremental move of the slider (see dashed line), the user experience is similar to using a scroll-bar in Microsoft Word.

Column Storage is Superior to Row Storage with Regards to Memory Consumption

Under the assumption to build a combined system for OLTP and OLAP data has to be organized for set processing, fast inserts, maximum (read) concurrency and low impact of reorganization. This imposes limits on the degree of compression for both row and column storage. While it is possible to achieve the same degree of compression in a row store as in a column store (see for e.g. IBM's Blink engine [V. Raman, G. Swart, L. Qiao, F. Reiss, V. Dialani, D. Kossmann, I. Narang, and R. Sidle. Constant-Time Query Processing. In Proceedings of the $24^{th}$ International Conference on Data Engineering, ICDE 2008, Apr. 7-12, 2008, Cancún, México, pages 60-69. IEEE, 2008]), a comparison of the two should be done assuming that the requirements above (especially fast inserts) are met, which excludes read-only row stores from the discussion. Comparing the memory requirements of column and row storage of a table, the difference in compression rate is obvious. Various analyses of existing customer data show a typical compression rate of 20 for column store and a compression rate of 2 for (write-optimized) row storage on disk. For further memory consumption estimates a factor of 10 is used based on compression in favor of column storage. As discussed in another chapter, column storage allows to eliminate all materialized views (aggregates) and calculate them algorithmically on demand. The storage requirements associated with these aggregates vary from application to application. The multi-dimensional cubes typically used in OLAP systems for materialized roll-ups grow with the cardinality of the individual dimensions. Therefore a factor 2 in favor of column storage based on the elimination of redundant aggregates is a conservative estimate.

Horizontal partitioning of tables will be used based on time and tenants. The option to partition into multiple dimensions is very helpful in order to use different qualities of main memory and processor speed for specific dimensions. Within the context of memory consumption the option to split tables into current data and historic data per year is extremely interesting. The analysis of customer data showed that typically 5-10 years of historic data (no changes allowed) are kept in the operational database.

Historic data can be kept accessible but reside on a much cheaper and slower storage medium (flash memory or disk). The current data plus the last completed year should be kept in DRAM memory on blades for the typical year over year comparison in enterprise systems. For the separation by time we use two time stamps, creation time and completion time. The completion time is controlled by the application logic e.g. an order is completely processed or an invoice paid. The completion date determines the year in which data can become historic, that means no further changes are possible. With regards to main memory requirements we can take a factor 5 in favor of column storage into account. It is only fair to mention a horizontal partitioning could also be achieved in record storage. Should the remaining table size for the current and last years partition still be substantial, horizontal partitioning by the data base management may occur. Ignoring memory requirements for indices and dimension dictionaries, a 10×2×5 time reduction in storage capacity (from disk to main memory) can be assumed. Next generation boards for blade servers will most certainly provide roughly 500 GB of main memory with a tendency of further growth. Since arrays of 100 blades are already commercially available, installations with up to 50 TB for OLTP and OLAP could be converted to an in-memory-only system on DRAM. This covers the majority of e.g. SAP's Business Suite customers as far as storage capacity is concerned.

What Happens to Typical Data-Entry Transactions?

Data entry transactions consist of three parts: user data entry, data validation and database update. Most of the data validation remains unchanged. Only the fact that any attribute of a table operates as an index can help to improve the quality of validation, e.g. in checking for duplicates of customer-, supplier-, parts-entries or incoming invoices. The database update is reduced to a mere insert. No indices (primary and secondary ones) need to be maintained and for journal entries, customer orders, stock movements etc no update of aggregations takes place. As a result, the throughput of transactional data entry will improve. The delta manager handles the initial insert of new tuples.

The delta storage is again organized as a column storage. Since data retrieval and inserts can influence each other, extreme care has to be taken in the implementation to avoid unnecessary locking This is particularly true with inserts in partitioned tables. In order to reduce the influence of inserts on dictionary tables and reduce the impact of merge operation between delta storage and main storage a two tier organization of the delta storage is a concept currently investigated. The focus of research and development shifts consequently from maximum compression of data to high speed insert with minimum effect of queries.

The Impact on Application Development

Applications based on a relational database using column storage should use the relational algebra and the extended SQL-features to delegate as much of the logic to the data base level and the stored procedures. In rewriting existing applications a reduction of the amount of code by more than 30% (in more formal applications like financials 40-50%) can be expected. Many parts can be completely restructured using the fully-indexed nature of column storage. In an ideal situation the application sets only the parameter for an algorithm completely defined by SQL (extended) and executed on database level. The application then works on the result set to produce the output (screen, e-mail, print, phone, etc.). As mentioned before, the strict use of minimal views is recommended. The high performance of the data base makes caching of data on the application level largely superfluous.

The option to partition tables in multiple dimensions (time, tenant, primary key range, etc) helps to achieve minimum response times for even larger tables. Since columns which have not yet been populated do not take any space in storage, except a 100 bytes stub, the addition of new columns to an existing table is simple.

To verify the inventors' findings a next generation accounting system for accounts receivable, accounts payable, general ledger and cost accounting including planning has been set up. The basis is SAP's on demand system ByDesign. All user interaction, configuration etc. remain identical to enable a complete parallel test.

The table for the journal entries has only one index, the accounting document number (plus line item number). There are no indices to connect the journal entries with the accounts (debitor, creditor, G/L or cost center etc.). The only attributes updated in place are: creation-, invalidation- and reconciliation time stamp. All other changes result in an insert of the changed entry and the invalidation of the old one.

There are no aggregates in form of materialized views; they will instead be created via algorithms on the fly. The data entry speed improves since only two tables (document header, document line item alias journal entry) receive inserts. The simplicity of the transaction allows reconsidering a forward recovery approach instead of backing out a failed transaction.

Every presentation of accounting data can be defined as a spreadsheet, identifying the account(s), their hierarchical structuring (sets), the values to be calculated (aggregates). After a translation into extended SQL, the statement can be verified for correction and assuming the SQL processor works flawlessly no further testing is required. The application can fully concentrate on user interaction and information presentation.

Not only have redundant tables been eliminated, but their maintenance in form of update procedures or the ETL process between the OLTP and OLAP parts of a system.

Column Storage in SaaS Applications

In SaaS (Software as a Service) applications several aspects of column storage are helpful. Columns which are unused are only represented by a stub. The introduction of a new attribute to a table means an update of the metadata and the creation of a stub for the column [S. Aulbach, T. Grust, D. Jacobs, A. Kemper, and J. Rittinger. Multi-Tenant Databases for Software as s Service: Schema-Mapping Techniques. In Proceedings of the ACM SIGMOD International Conference on Management of Data, SIGMOD 2008, Vancouver, BC, Canada, Jun. 10-12, 2008, pages 1195-1206. ACM, 2008]. The attributes can from then on be used by the application. This is an important feature for the ongoing development of the application without any interruption for the user. The join with external data, which after import to the host system is held in column storage, is extremely efficient even for very large tables (minimum main memory accessed) the integration which after applications happens via the service layer (predefined) are SQL. In both cases the greatly improved response time will be appreciated.

Not only can the application now determine what base date for a query should be chosen but the development of the content (attributes) of individual tuples can be monitored (e.g.

lifecycle of a customer order, control of sensitive data in human resources or accounts payable).

FIG. 10 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system 1400 may implement a client-server embodiment of the present invention. For example, the computer system 1410 may implement a client system that accesses the server 1431 through the Internet 1430. The computer system 1410 may implement a graphical user interface or otherwise present data to, and accept input from, a user. The server 1431 may include components similar to those of the computer system 1410. The server 1431 may store the database and may implement the database processing techniques described above. Alternatively, the server 1431 may implement the database processing techniques described above and may interface with another server that stores the database, e.g., the server 1432.

CONCLUSION AND OUTLOOK

The inventors estimate that enterprise systems for even larger companies (e.g. up to 100 million sales activities per year), where all business transactions, queries, including unrestricted aggregations and time-based sequences, can be answered in just a couple of seconds (including the surprisingly costly presentation layer). They expect that the impact on management of companies will be huge, probably like the impact of Internet search engines on all of us. Information will finally be at your fingertips [B. Gates. Information At Your Fingertips. Keynote address, Fall/COMDEX, Las Vegas, Nev., November 1994] without any restriction.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for operating a database, comprising:
    storing a tuple having a binary status field in the database;
    updating a binary status of the tuple in the database by means of in-place updating the binary status field of the tuple with a time stamp;
    executing, by a computer system, a query that uses the binary status field; and
    outputting, by the computer system, a result of the query.

2. The method according to claim 1, wherein the database is a column store database.

3. The method according to claim 2, wherein the column containing the binary status fields is stored uncompressed.

4. A computer-implemented method for operating a database, comprising:
    storing a tuple having a binary status field in the database;
    updating a binary status of the tuple in the database by means of inserting an updated tuple into the database, wherein the binary status field of the updated tuple contains a time stamp;
    executing, by a computer system, a query that uses the binary status field; and
    outputting, by the computer system, a result of the query.

5. The method according to claim 4, wherein the database is a column store database.

6. The method according to claim 5, wherein the column containing the binary status fields is stored uncompressed.

7. A computer system that implements a computer program for operating a database, said computer system including a processor that is configured to execute the computer program and a memory that is configured to store the database, said computer program embodied on a non-transitive storage medium and comprising:
    an updating component for updating a binary status of a tuple in the database by means of in-place updating the binary status field of the tuple with a time stamp;
    an executing component for executing a query that uses the binary status field; and an outputting component for outputting a result of the query.

8. A computer system that implements a computer program for operating a database, said computer system including a processor that is configured to execute the computer program and a memory that is configured to store the database, said computer program embodied on a non-transitive storage medium and comprising:
- an updating component for updating a binary status of a tuple in the database by means of inserting an updated tuple into the database, wherein the binary status field of the updated tuple contains a time stamp;
- an executing component for executing a query that uses the binary status field; and
- an outputting component for outputting a result of the query.

* * * * *